United States Patent [19]

Bland et al.

[11] Patent Number: 5,517,650
[45] Date of Patent: May 14, 1996

[54] BRIDGE FOR A POWER MANAGED COMPUTER SYSTEM WITH MULTIPLE BUSES AND SYSTEM ARBITRATION

[75] Inventors: Patrick M. Bland, Austin, Tex.; Richard G. Hofmann, Cary, N.C.; Dennis Moeller, Boca Raton, Fla.; Suksoon Yong, Austin, Tex.; Moises Cases, Delray Beach; Lance Venarchick, Boca Raton, both of Fla.; Stephen Weitzel, Round Rock, Tex.

[73] Assignee: International Business Machines Corporation, Armonk, N.Y.

[21] Appl. No.: 358,887

[22] Filed: Dec. 19, 1994

[51] Int. Cl.⁶ .............................. G06F 1/32; G06F 13/362
[52] U.S. Cl. ........................................... 395/750; 395/306
[58] Field of Search ................................... 395/750, 306, 395/308; 364/707

[56] References Cited

U.S. PATENT DOCUMENTS 5,167,024  11/1992  Smith et al. ............................. 395/375
5,396,602  3/1995   Amini et al. ............................ 395/293
5,396,635  3/1995   Fung ....................................... 395/800

*Primary Examiner*—Jack B. Harvey
*Assistant Examiner*—Ami P. Shah
*Attorney, Agent, or Firm*—R. S. Babayi

[57] ABSTRACT

A bridge for interfacing buses in a computer system having an industry standard architecture (ISA) bus and a peripheral controller interconnect (PCI) bus is coupled between the ISA and PCI buses. Devices coupled to the buses are either PCI bus-compliant devices or are non-PCI bus-compliant devices. A power management device in the computer system is able to place the computer system into a low power suspend mode, a resume mode and an active mode. The bridge has a multi-tiered arbitration device for arbitrating among the PCI bus-compliant devices and the non-PCI bus-compliant devices for control of the computer system. The arbitration device is responsive to the power management device to controllably suspend arbitration when the power management device indicates that the suspend mode is being entered.

8 Claims, 6 Drawing Sheets

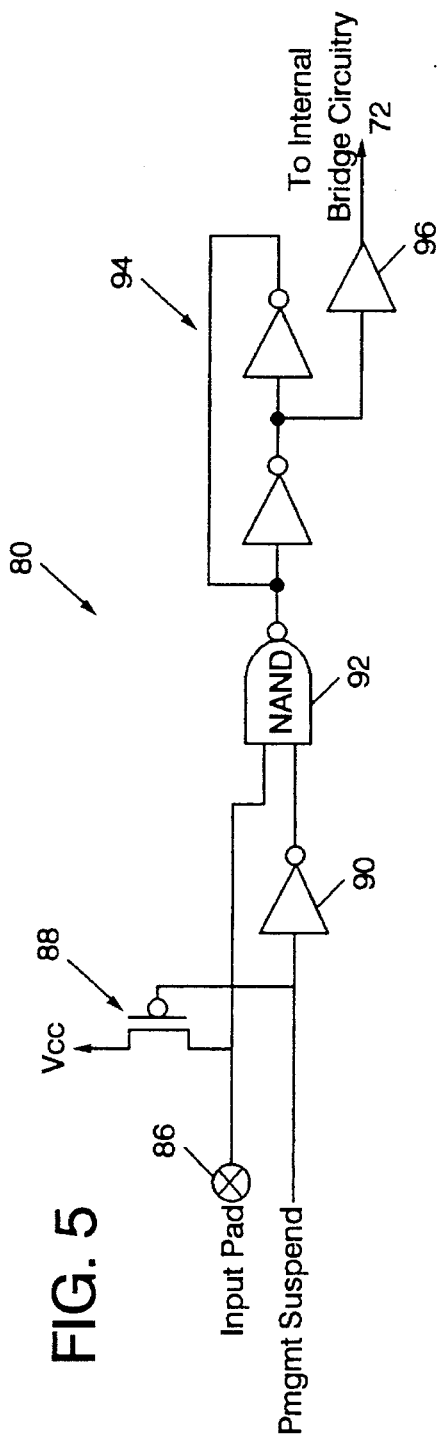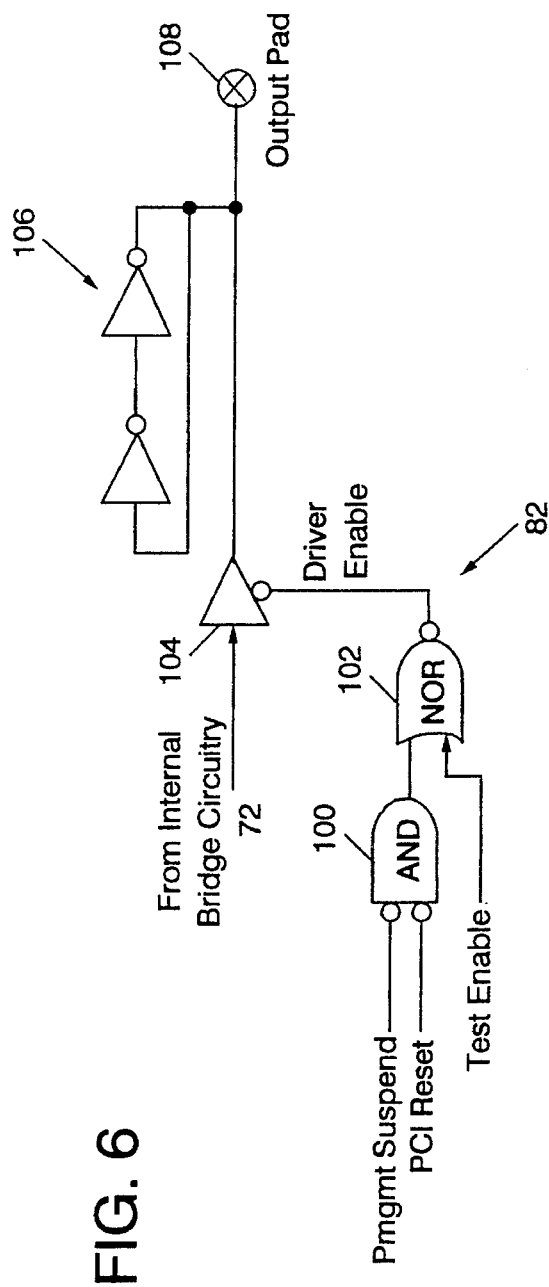
FIG. 5
FIG. 6

BRIDGE FOR A POWER MANAGED COMPUTER SYSTEM WITH MULTIPLE BUSES AND SYSTEM ARBITRATION

BACKGROUND OF THE INVENTION

1. Field of the Invention

The present invention relates to the field of digital computer systems, and more particularly, to power management in a system having multiple buses and system arbitration.

2 Description of Related Art

In computer systems, electronic chips and other components are connected with one another by buses. A variety of components can be connected to the bus providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, higher-speed input/output devices commonly used in computer systems require faster buses. A solution to the general problem of sending and receiving data from the processor to any high-speed input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, etc. can also attach directly or indirectly (e.g., through a host bridge) to the PCI bus.

A bridge chip is provided between the PCI bus and the ISA bus in order to provide communication between devices on the two buses. The bridge chip essentially translates the ISA bus cycles to PCI bus cycles, and vice versa.

A computer system can have other types of expansion buses instead of, or in addition to, the ISA bus. These include the Microchannel (a trademark of IBM) bus, the Apple bus, etc. Numerous types of devices are available for use with these various bus architectures. In a computer system that includes a PCI bus and an expansion bus, such as the ISA, Microchannel or Apple buses, the devices in the system can be categorized as PCI-compliant devices that adhere to the PCI specified architecture, and non-PCI compliant devices that do not adhere to the PCI specified architecture.

The devices in most computer systems must arbitrate for use of various resources in the system, such as buses, since the resources are often shared by a plurality of devices. In an arbitration scheme, devices contend for the use of the shared resource, either through a central arbitration mechanism, or a distributed arbitration scheme. A protocol is normally followed in which a device that wants to use the resource will assert a request signal to the arbitration mechanism. Assuming that the device wins the arbitration, the arbitration mechanism will assert a grant or acknowledge signal, allowing the device to use the resource.

Many computer systems now use some type of "power management" to temporarily place the computer system into a suspend mode in which power is conserved. For example, if the computer system is a laptop computer, a power management device may cause a computer system to enter the suspend mode to save power whenever the laptop is closed. The suspend mode may also be entered if a key on the keyboard has not been pressed for a prolonged period of time. There are numerous other events which will cause a power management device to place the computer system into a suspend mode, and there are numerous available power management devices.

After some period of time, or a defined event occurs (such as the opening of the laptop cover), the power management device enters a resume mode. In the resume mode, the power management device essentially restores the computer system to the state it was in before it entered the suspend mode.

In a multi-bus system having system arbitration performed by the bridge chip, the fact that different types of devices, some PCI-compliant and some non-PCI-compliant, are resident in the system. These different types of devices typically have different arbitration protocols. When the multi-bus system is to include a power management capability, providing a graceful entering and exiting of the low-power suspend mode poses a difficult problem for a system designer due to these different arbitration protocols.

SUMMARY OF THE INVENTION

There is a need for a bridge chip in a multi-bus computer system that provides system arbitration all of the devices on the different buses, while also supporting power management functions by allowing a graceful entering and leaving of the suspend mode.

This and other needs are met by the present invention which provides a bridge for interfacing between buses of a computer system that has a first bus, a second bus, first bus devices that are first bus-compliant, second bus devices that are non-first bus-compliant, a central processing unit (CPU) and a power management device that places the computer system into a suspend mode, a resume mode and an active mode. The bridge comprises an arbitration device for arbitrating among the first bus-compliant devices and the non-first bus-compliant devices for control of the computer system. The arbitration device is responsive to the power management device to controllably suspend arbitration when the power management device indicates that the suspend mode is being entered.

The present invention has the advantage of supporting power management in a multi-bus system that has a multi-tiered arbitration for control of the system among first bus-compliant devices, such as PCI bus-compliant devices, and non-first bus-compliant devices, such as non-PCI bus-compliant devices. These non-PCI bus-compliant devices can include ISA bus-compliant devices, Microchannel bus-compliant devices, Apple bus-compliant devices, etc.

Another aspect of the present invention supports power management in a multi-bus system by providing a bridge having receiver, output, and bidirectional cells, these cells at least one of receiving input signals to the bridge and providing output signals from the bridge. The bridge comprises a plurality of suspend circuits, each suspend circuit coupled to a separate one of the receiver, output or bidirectional cells. Each suspend circuit includes a logic circuit for receiving a power management suspend signal and disabling the cell coupled to the suspend circuit in response to assertion of the power management suspend signal, and a keeper circuit that receives at least one of the input signals or the output signals and maintains a value of this input signal or this output signal.

The present invention provides the advantage of disabling the high power consumption circuitry of the bridge, namely the receiver, output and bidirectional cells, during the suspend mode to reduce power consumption. At the same time, however, the keeper circuit of the present invention maintains the value of the input signal or the output signal. This allows the bridge logic to still be able to use the input signal as if the suspend mode had not been entered, and off-chip devices are able to see the output signal as it was prior to the entering of the suspend mode.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 5 is a logic diagram of a suspend circuit for a bridge receiver cell constructed in accordance with an embodiment of the present invention.

FIG. 6 is a logic diagram of a suspend circuit for a bridge output cell constructed in accordance with an embodiment of the present invention.

DESCRIPTION OF THE ILLUSTRATIVE EMBODIMENTS

Figure 1:
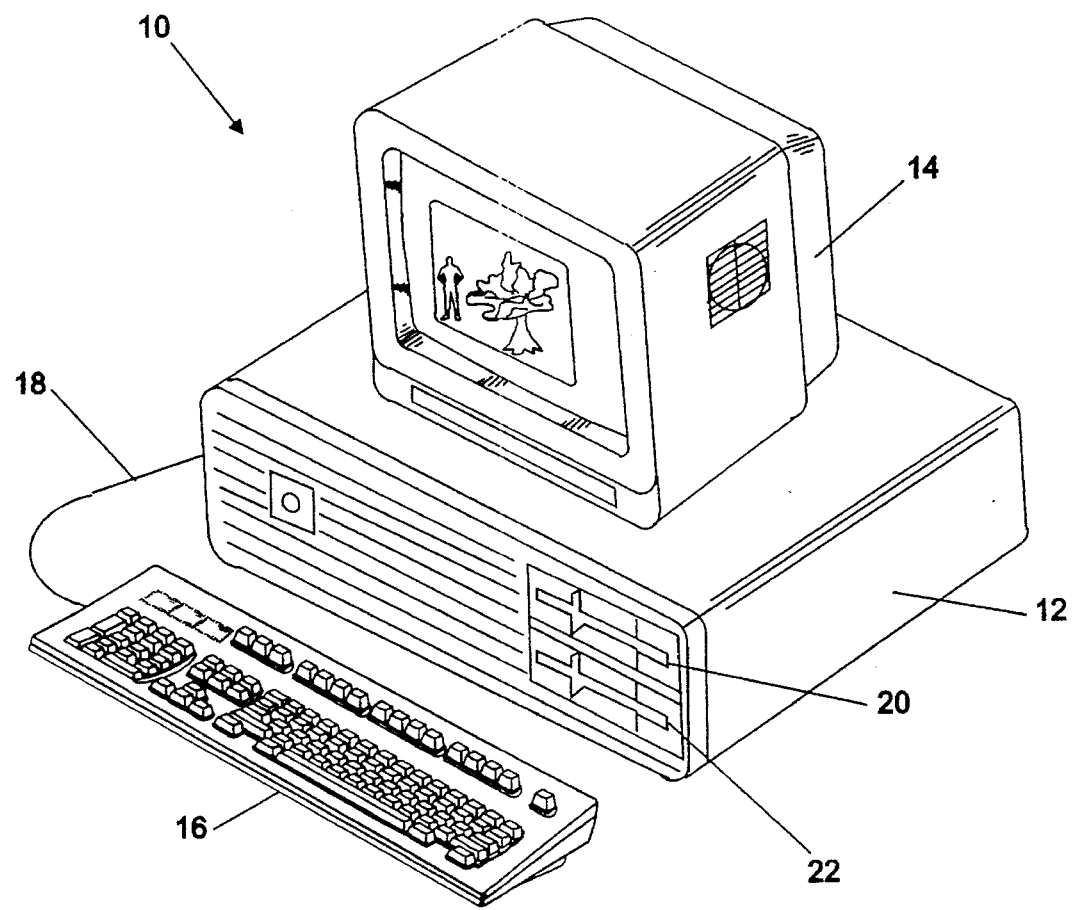
FIG. 1 is a perspective view of a computer system of the present invention.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is nonaccessible to the user, and user-accessible floppy disks, as well as, optionally, CD-ROM drives 20 and 22.

Figure 2:
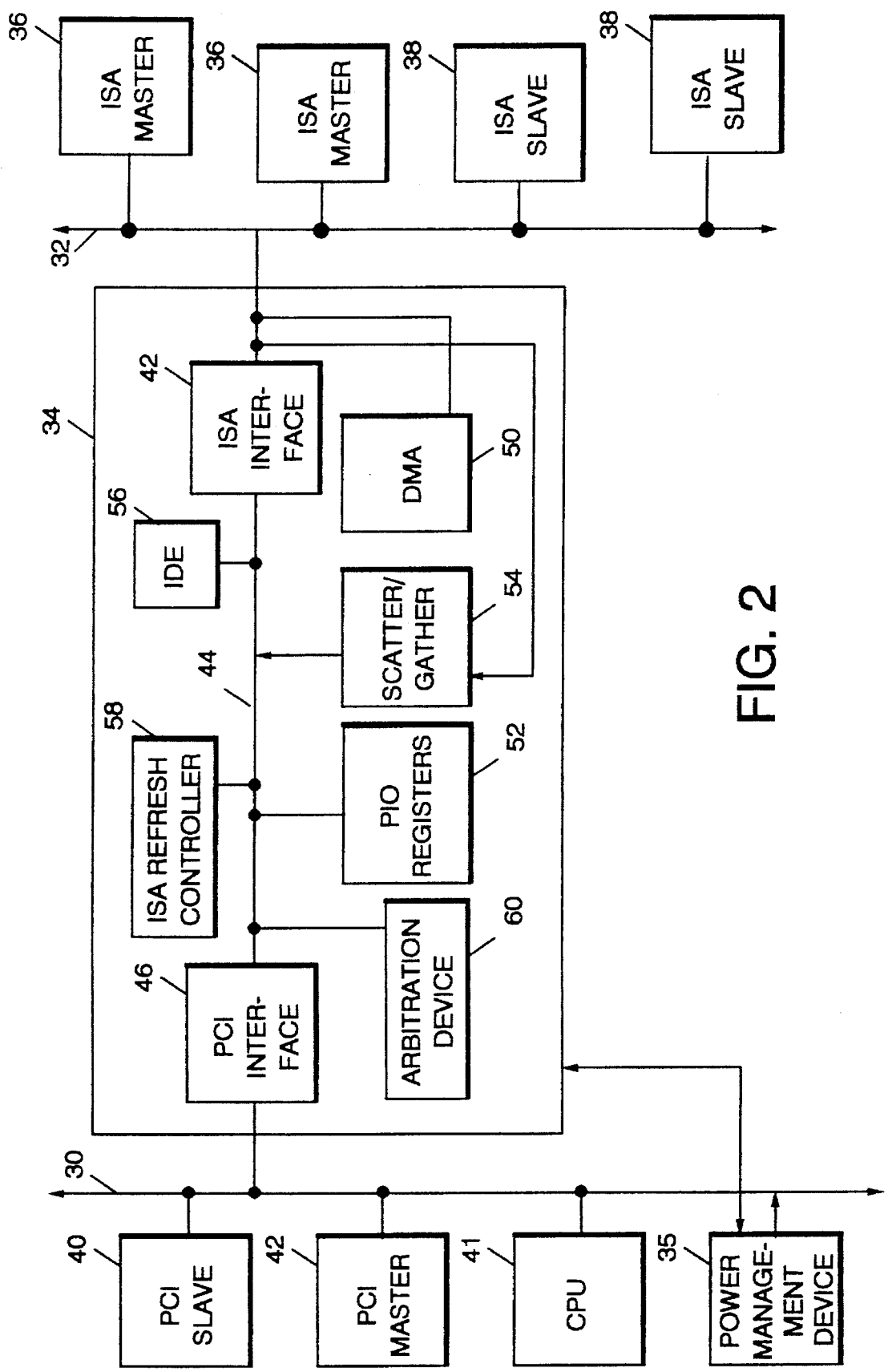
FIG. 2 is a block diagram of the computer system of FIG. 1 constructed in accordance with an embodiment of the present invention.

FIG. 2 is a block diagram of a computer system constructed in accordance with an embodiment of the present invention. The system includes a PCI bus 30, an ISA bus 32, with a plurality of ISA masters 36 and ISA slaves 38. A PCI memory slave 40, a PCI master 42, and a central processing unit (CPU) 41 are coupled to the PCI bus 30.

Although the illustrated exemplary embodiment describes an ISA bus 32 and a PCI bus 30, the invention is not limited to these particular bus architectures. Rather, the present invention can be used in multi-bus systems that have different bus architectures, such as the Microchannel bus and the Apple bus. For purposes of explanation, however, the present invention will be described for an exemplary system having a PCI bus and an ISA bus.

The bridge chip 34, which provides an interface between the PCI bus 30 and the ISA bus 32, contains an ISA interface 42 coupled between the ISA bus 32 and a system bus 44. A PCI interface 46 is provided between the PCI bus 30 and system bus 44. The bridge chip 34 also has a DMA control circuit 50, programmable I/O (PIO) registers 52, and a scatter/gather unit 54. The DMA control circuit 50 is coupled to the ISA bus 32.

A power management device 35 is coupled to the bridge chip 34 and is also coupled to the PCI bus 30. The power management device 35 can be a conventional power management device that operates to place a computer system into a low-power suspend mode and reactivate it for a normal operating mode by entering a resume mode. Prior to entering the suspend mode, however, certain tasks must be performed so that a graceful entry into the suspend mode, and eventual exit from this mode, can be accomplished.

The ISA bus interface 42 in the bridge chip 34 translates ISA bus cycles into system bus cycles for use by the bridge chip 34. The PCI bus interface 46 converts PCI bus cycles from the PCI bus 30 into system bus cycles for the bridge chip 34. The DMA control circuit 50 controls DMA control of memory accesses within the system. The DMA control circuit 50 provides a plurality of separate DMA channels over which memory accesses involving the individual DMA slave/ISA masters 36 are respectively communicated.

The DMA control circuit 50 is programmable over either the ISA bus 32 as in the prior art, or by the scatter/gather unit 54. Allowing the DMA control circuit 50 to still be programmed over the ISA bus 32 permits compatible PIO operation to occur when the DMA controller is programmed, so that if compatibility software is running, it appears that the DMA control circuit 50 is residing on the ISA bus 32. The scatter/gather unit 54 is an alternative means of programming the DMA control circuit, and such units are well-known.

The bridge 34 can also contain other components, such as an Integrated Drive Electronics (IDE) controller 56, and an ISA refresh controller 58.

Certain ones of the various devices that are ISA compatible, and therefore non-PCI compliant, can arbitrate for the control of the system, as can the PCI-compliant devices. The non-PCI compliant devices include the DMA control circuit 50, the ISA bus master 36, the scatter/gather unit 54, the IDE controller 56, and the ISA refresh controller 58. The PCI-compliant devices include PCI agents such as the PCI master (or "initiator") 42 and the CPU 41.

Figure 3:
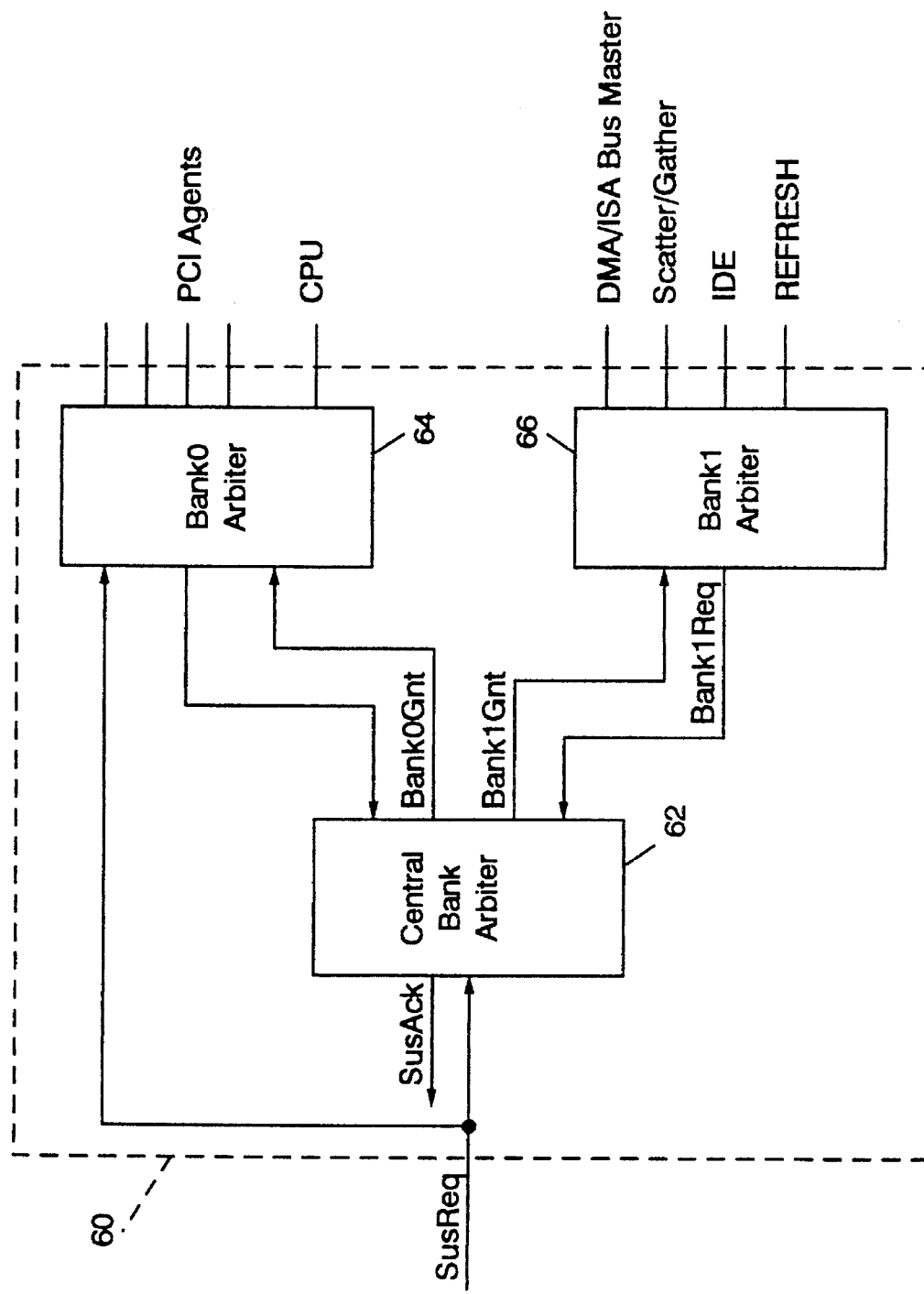
FIG. 3 is a block diagram of an exemplary embodiment of an arbitration device in a bridge.

In order to arbitrate among the different types of devices that can request control of the system, the bridge chip 34 also includes an arbitration device 60 that employs a multi-tiered system arbitration scheme according to the present invention. FIG. 3 is a block diagram of an exemplary embodiment of the arbitration device 60 according to the present invention.

The arbitration device 60 has a central bank arbiter 62, a first bank0 arbiter 64, and a second bank1 arbiter 66 that forms a multi-tiered arbitration arrangement. The bank0 arbiter 64 contains all of the associated arbitration request and grant signals from the agents (the masters 42) on the PCI bus 30, as well as the CPU 41. This bank0 arbiter 64 can therefore be considered to be a PCI-compliant bank arbiter. By contrast, the bank1 arbiter 66 contains all of the associated request and grant signals for the non-PCI compliant devices, such as the DMA control circuit 50, the ISA bus master 36, the scatter/gather unit 54, the IDE controller 56, and the ISA refresh controller 58. This bank1 arbiter 66 can therefore be referred to as a non-PCI compliant bank arbiter.

Each of the bank arbiters 64, 66 has its own request and grant signals which are connected to the central bank arbiter 62. The central bank arbiter 62 selects which bank arbiter 64, 66 will be granted control of the computer system resources at any given time. The power management device 35 is coupled to the central bank arbiter 62 through an interface. When the power management device 35 operates to place the bridge chip 34 into a suspend mode by powering down the off-chip drivers and receivers (as will be explained later), the internal circuitry of the bridge chip 34, including the arbitration device 60, will retain its functionality.

The operation of the arbitration device of the present invention is as follows. When the power management device 35 initiates a suspend mode operation, it asserts a suspend request (SusReq) signal to the arbitration device 60. The central bank arbiter 62 receives this signal and then determines if either the bank0 arbiter 64 or the bank1 arbiter 66 has arbitration control of the computer system. If neither bank arbiter 64, 66 has control, central bank arbiter 62 drives a bank0 grant signal (Bank0Gnt) active and a bank1 grant signal (Bank1Gnt) inactive, and masks off a bank1 request signal (Bank1Req). The bank0 arbiter 64 then asserts a CPU grant signal and masks off all PCI request signals. This action effectively "parks" the arbitration device 60 on the CPU 41.

Once the arbitration device 60 is parked on the CPU 41, a suspend acknowledge signal (SusAck) is driven active to the power management device 35. This indicates to the power management device 35 that a suspend state signal (SusStat) may be activated to the bridge chip 34 to turn off many of the I/O drivers and pull-up/pull-down circuits to place the bridge chip 34 into a low-power suspend state.

When the power management device 35 desires to start up the system again in a resume operation, it deasserts the suspend state signal (SusStat) to the bridge chip 34. This will power up all of the drivers/receivers and the pullup/pulldown circuits to resume operation in the state of operation active before the suspend sequence was initiated. The power management device 35 will also deassert the suspend request signal (SusReq), causing the central bank arbiter 62 to deassert its suspend acknowledge signal (SusAck) and unmask requests (Bank1Req) from the bank1 arbiter 66 and unmask PCI requests. This allows both bank arbiters 64, 66 to once again request control of the system.

In the event that either the bank0 arbiter 64 or the bank1 arbiter 66 has control of the system when a suspend request signal (SusReq) is received by the central bank arbiter 62, a different sequence of events occur. If the bank0 arbiter 64 (i.e. the PCI-compliant arbiter) is active when the suspend request signal (SusReq) goes active, then the central bank arbiter 62 will immediately deassert the bank0 grant signal (Bank0Gnt) to the bank0 arbiter 64. This is an indication to the bank0 arbiter 64 that it should deassert its active grant signal to the current PCI agent that has control of the system. Once the PCI agent samples it grant deasserted, it will complete its current transaction and release its arbitration request signal as soon as possible. Once the PCI agent relinquishes control of the bus, the bank0 arbiter 64 will park on the CPU 41 and the bank0 arbiter 64 will mask any further requests from the PCI agents. The central bank arbiter 62 will mask bank1 arbiter 66 requests and return the suspend acknowledge signal (SusAck) to the power management device. This allows the bridge chip 34 to be placed into the suspend mode as described above.

In the event that the bank1 arbiter 66 is active when the suspend request signal (SusReq) is driven active, the central bank arbiter 62 will immediately deassert the bank1 grant signal (Bank1Gnt). However, the non-PCI compliant bank1 devices do not have a mechanism for preemption similar to that of PCI-compliant devices. The active non-PCI compliant device on the bank1 arbiter 66 will perform all of its system activities as usual until completed and then deassert its request signal. The bank 1 arbiter 66 will then deassert the bank1 request signal (Bank1Req). The central bank arbiter 62, upon sampling the deasserted bank1 request signal (Bank1Req) will assert the bank0 grant signal (Bank0Gnt) so that the bank0 arbiter 64 will park on the CPU 41 and mask all PCI arbitration requests. The central bank arbiter 62 will then mask any further bank1 arbiter requests and return the suspend acknowledge signal (SusAck) to the power management device 35. This allows the bridge chip 34 to be placed into the suspend mode as described above.

The method described above resolves the system arbitration in a graceful manner upon initiation of the suspend mode. The bridge chip 34 itself also should be powered down. This is done according to the present invention by turning off many of the I/O drivers/receivers and pullup/pulldown circuits as explained below.

Figure 4:
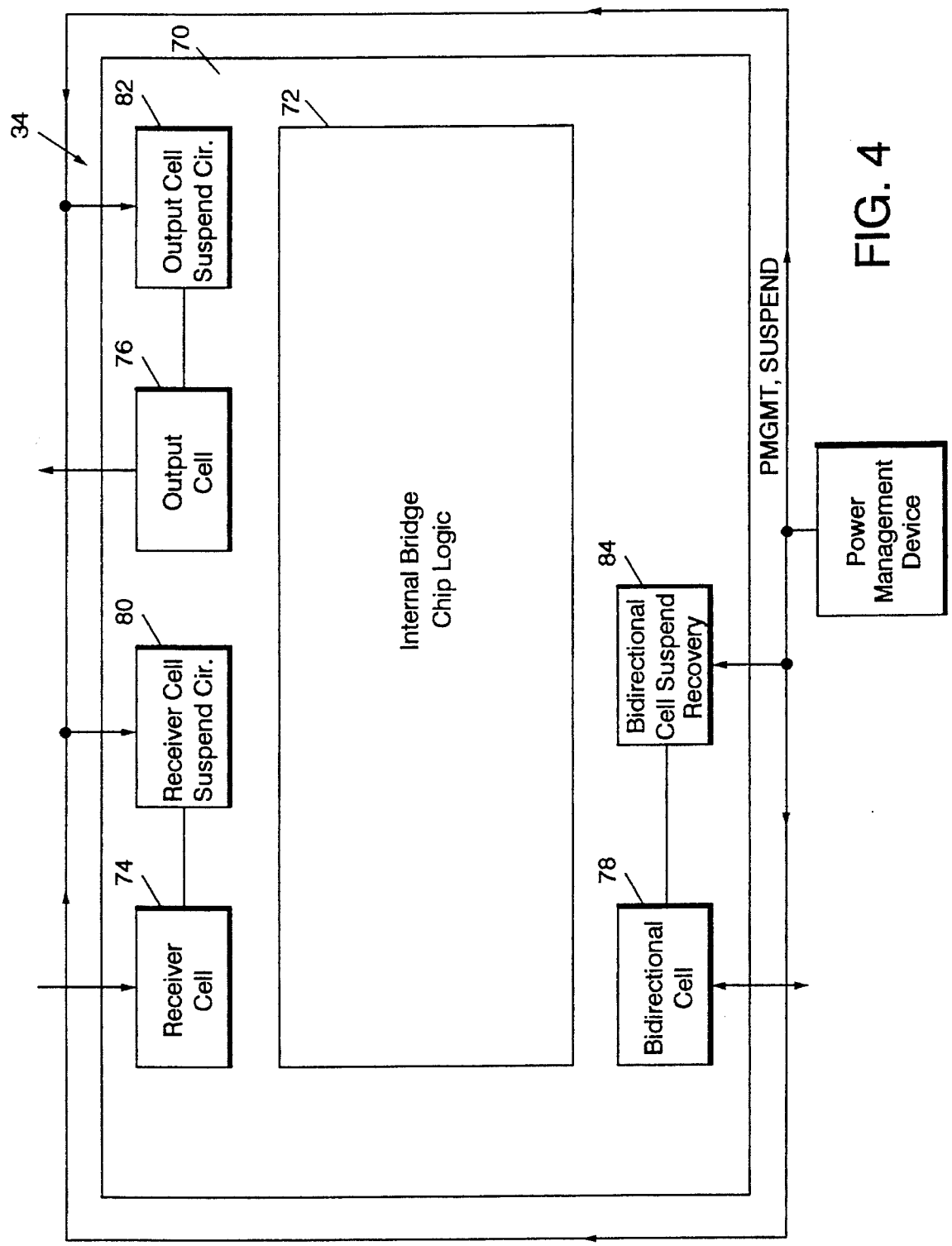
FIG. 4 is a top view of a bridge chip.

FIG. 4 is a top view of an exemplary embodiment of a bridge chip 34 constructed according to an exemplary embodiment of the present invention. It includes I/O peripheral circuitry 70 with bonding or I/O pads for off-chip communication. The various functional elements of the bridge chip 34 depicted in FIG. 2, such as the DMA control circuit 50, are implemented in the internal bridge chip logic 72. As is well-known, the circuits of the internal bridge chip logic 72 are isolated from the I/O peripheral circuitry 70 so that any transitions on the external circuitry do not cause spurious glitches in the internal circuitry.

The drivers and receivers in the I/O peripheral circuitry 70 are relatively large transistors that drive large external capacitive loads. Accordingly, in order to place the bridge chip 34 into a low-power suspend mode, these drivers and receivers should be effectively turned off, while the internal bridge circuitry 72 can remain active. However, the present invention provides the advantage of retaining the signals during the suspend mode that were at the drivers and receivers before the suspend mode was entered.

Located on the I/O peripheral circuitry 70 are a plurality of receiver cells 74, output cells 76, and bidirectional cells 78. A suspend circuit is associated with each of these different types of cells. Thus, there is a separate receiver cell suspend circuit 80, an output cell suspend circuit 82, and a bidirectional suspend circuit 84 for the respective cells. The suspend circuits 80, 82, 84 are all controlled by a power management suspend signal PMGMT SUSPEND. When asserted by the power management device 35, the PMGMT SUSPEND signal causes the suspend circuits 80, 82, and 84 to turn off the cells 74, 76, and 78. These cells are enabled once again when the PMGMT SUSPEND signal is deasserted to enter the resume mode.

FIG. 5 is a logic circuit diagram of an exemplary embodiment of the receiver cell suspend circuit 80 according to the present invention. The input pad 86 is where the wire from off the chip connects to the bridge chip 34. A pull-up transistor (or alternatively, a pull-down transistor) 88 is a termination. The PMGMT SUSPEND signal controls the pull-up transistor 88 and is an input to an inverter 90, whose output is connected to one input of the NAND gate 92.

When the PMGMT SUSPEND signal is asserted, this turns off the pull-up transistor 88. This signal also causes the output of the inverter 90 to go low, effectively disabling any further inputs by the NAND gate 92 and it can no longer switch. The output of the NAND gate 92 is stored in a keeper circuit 94 acting as a latch. The second inverter in the keeper circuit 94 is implemented with very small transistors and has a weak drive, so that when the NAND gate 94 switches, it will easily overdrive the output of the second inverter and switch the network. However, when the NAND gate 94 shuts off due to assertion of the PMGMT SUSPEND signal, the keeper circuit will retain the previous value.

The kept signal is sampled between the inverters of the keeper circuit 94 and provided via an input buffer 96 to the internal bridge chip circuitry 72 where the signal is processed as if the computer system were still in the active mode. The internal bridge chip circuitry 72 sees the input signal and is not aware that the system is in a suspend mode.

FIG. 6 is a logic circuit diagram of an exemplary embodiment of the output cell suspend circuit 82 according to the present invention. The output cell suspend circuit 80 includes an AND gate 100 coupled to one input of a NOR gate 102. The AND gate 100 receives an inversion of the PMGMT SUSPEND signal and a PCI RESET signal that indicates whether the system is in a reset condition. If either the power management suspend mode goes active (PMGMT SUSPEND asserted) or there is a PCI reset (PCI RESET asserted), the output driver 104 is disabled. The NOR gate 102 has a second input, the test enable input, that allows the output driver 104 to be enabled directly by asserting the TEST ENABLE signal high.

A keeper circuit 106 is coupled to the output of the output driver 104 and to an output pad 108 located on the I/O peripheral circuitry 70. The keeper circuit 106 allows other elements in the system that are off-chip to see the previous value that the output driver 104 was driving. The current state is retained so that external components sampling the output pad 108 will not be able to distinguish that the output driver 104 was turned off.

Figure 7:
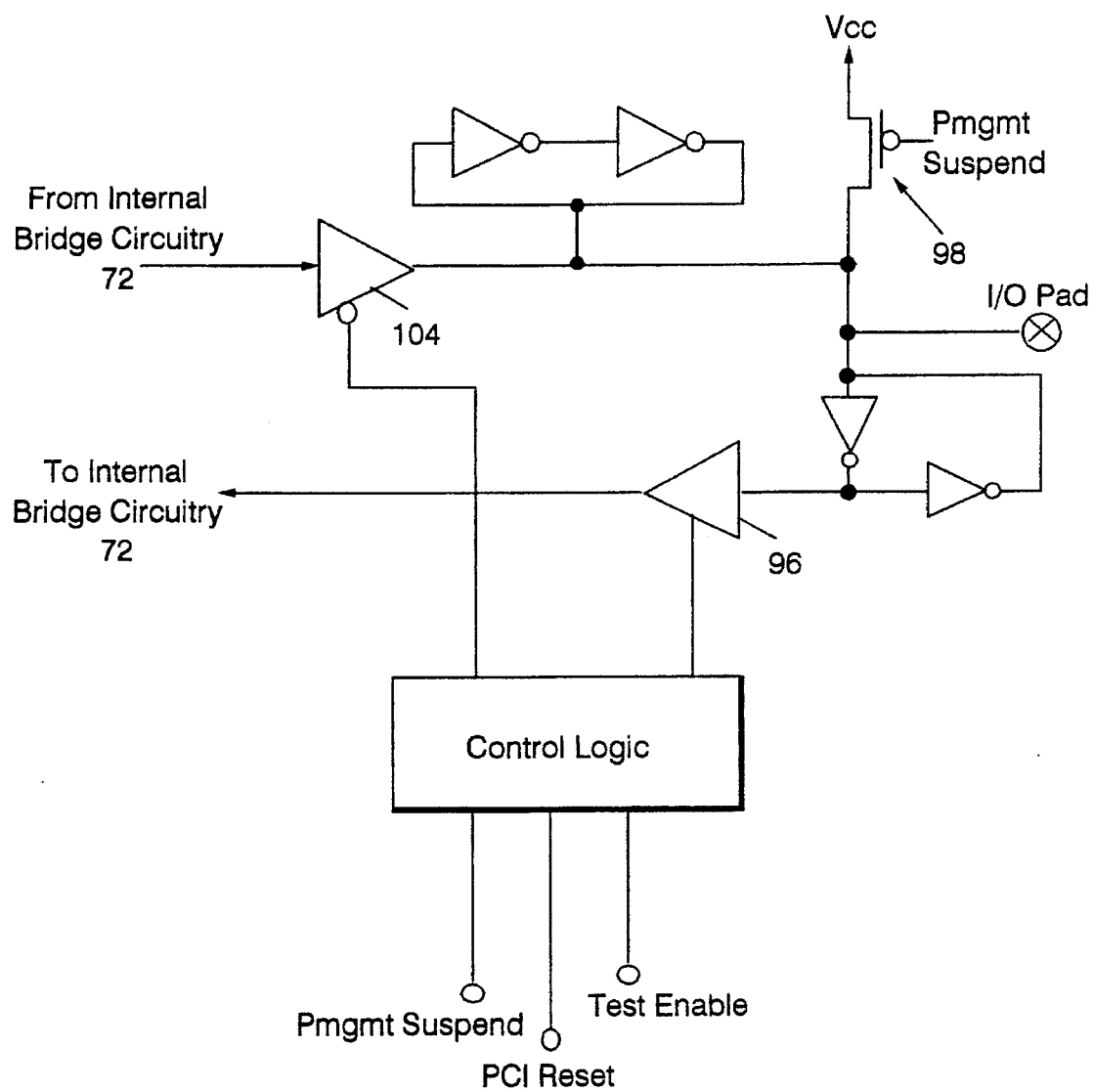
FIG. 7 is a logic diagram of a suspend circuit for a bridge output cell constructed in accordance with an embodiment of the present invention.

FIG. 7 is a logic circuit diagram of an exemplary embodiment of the bidirectional cell suspend circuit 84 according to the present invention. As one of ordinary skill in the art can appreciate, the bidirectional cell suspend circuit 84 is a combination of the receiver cell suspend circuit 80 and the output cell suspend circuit 82, and therefore will not be explained in greater detail.

The suspend circuits of the present invention provide programmability for the bridge chip 34 under the control of the power management device 35 during the suspend mode. The control circuitry can be integrated to maximize chip density and minimize path delay penalties. Programmable termination networks are provided for pulling unconnected inputs to the inactive or deasserted state and supporting open collector circuitry. Furthermore, the suspend circuits of the present invention support chip testing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bridge for interfacing between buses of a a computer system that has a first bus, a second bus, first bus devices that are first bus-compliant, second bus devices that are non-first bus-compliant, a central processing unit (CPU) and a power management device that places the computer system into a suspend mode, a resume mode and an active mode, the bridge comprising:

an arbitration device for arbitrating among the first bus-compliant devices and the non-first bus-compliant devices for control of the computer system, and responsive to the power management device to controllably suspend arbitration when the power management device indicates that the suspend mode is being entered;

wherein the arbitration device is a multi-tiered arbiter that includes a first bank arbiter through which the first bus-compliant devices arbitrate, a second bank arbiter through which the non-first bus-compliant devices arbitrate, and a central bank arbiter which arbitrates among the first and second bank arbiters to provide arbitration for the system among the first bus-compliant devices and the non-first bus-compliant devices.

2. The bridge of claim 1, wherein the central bank arbiter and the first bank arbiter include suspend request signal inputs coupled to the power management device, the suspend request signal indicating that the suspend mode is being entered.

3. The bridge of claim 2, wherein the central bank arbiter includes a first bank grant output coupled to the first bank arbiter, and a second bank grant output coupled to the second bank arbiter, the assertion of a bank grant output signal by the central bank arbiter allows at least one of the first and second bank arbiters to perform arbitration.

4. The bridge of claim 3, wherein the central bank arbiter includes logic for asserting the bank grant output signal to the first bank arbiter and deasserting the bank grant output signal to the second bank arbiter in response to receipt of the suspend request signal.

5. The bridge of claim 4, wherein the first bank arbiter includes logic for allowing any first bus transaction to complete when the first bank arbiter receives the suspend request signal, masking any further requests from the first bus-compliant devices, and asserting a CPU grant signal to provide control of the system to the CPU during the suspend mode.

6. The bridge of claim 5, wherein the second bank arbiter includes logic for allowing any non-first bus transaction to complete when the second bank arbiter recognizes the deassertion of the bank- grant output signal to the second bank arbiter, and subsequently causing the second bank arbiter to suspend arbitration.

7. The bridge of claim 6, wherein the central bank arbiter includes logic for masking off system arbitration requests from the second bank arbiter after the central bank arbiter has received the suspend request signal.

8. The bridge of claim 7, wherein the first bus is a peripheral component interconnect (PCI) bus and the second bus is an industry standard architecture (ISA) bus, and the first bus-compliant devices are PCI-compliant devices and the non-first bus-compliant devices are non-PCI compliant devices.

\* \* \* \* \*